United States Patent [19]
Rubio et al.

[11] 3,789,660
[45] Feb. 5, 1974

[54] PROCESS, MACHINE AND CHART FOR TENSILE TESTING

[75] Inventors: Manuel Jesus Rubio, Bridgeport, Conn.; Victor Mario Leal, Monterrey, Nueno Leon, Mexico

[73] Assignee: Roberto Gonzalez Barrera, Vista Hermosa, Monterrey, Mexico

[22] Filed: Nov. 3, 1971

[21] Appl. No.: 195,313

[52] U.S. Cl. .................................... 73/169, 73/103
[51] Int. Cl. ........................ G01n 3/14, G01n 33/10
[58] Field of Search...... 73/432 R, 169, 88 R, 103, 73/150, 95

[56] References Cited
UNITED STATES PATENTS
| | | | |
|---|---|---|---|
| 3,117,443 | 1/1964 | McClelland et al. | 73/103 |
| 2,267,561 | 12/1941 | Halton | 73/169 |

FOREIGN PATENTS OR APPLICATIONS
| | | | |
|---|---|---|---|
| 274,281 | 6/1951 | Switzerland | 73/169 |

*Primary Examiner*—Richard C. Queisser
*Assistant Examiner*—Joseph W. Roskos
*Attorney, Agent, or Firm*—Jackson, Jackson and Chovanes

[57] ABSTRACT

Processes of testing and a testing machine especially suited to tensile testing of dough-like materials. In the invention the test specimen is pressed into jaws whose sides do not move relative to one another but grip it because the test specimen converges at the mouths of the jaws, and while one of the jaws is fixed, the other jaw is pulled to elongate the specimen to a tension means. In the preferred embodiment the tension is applied to the specimen through the agency of a spiral spring. Force application is plotted on a chart which moves with the force application means, and a pencil or other marking means plots on the chart transverse to the direction of force application the elongation of the moving jaw. In the preferred embodiment also a zig-zag motion is imparted to the line plotted in proportion to time. The invention contemplates making the jaws into a mold by attaching a removable mold bottom, and by notches in the mold sides defining a path of a cutter so that the portion of the specimen under test is the same cross section as the mouths of the jaws. The invention also includes a special chart which has isochronic zig-zags.

12 Claims, 10 Drawing Figures

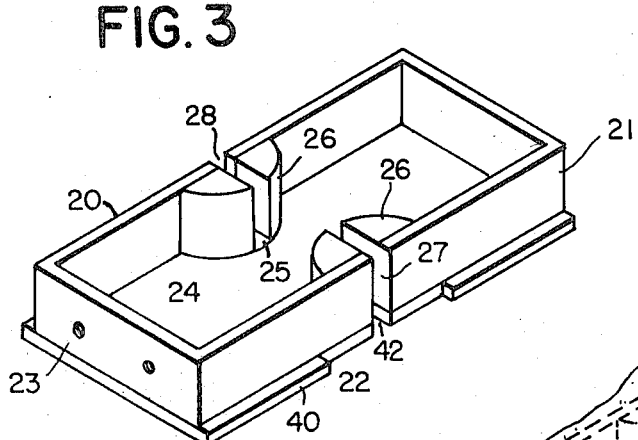
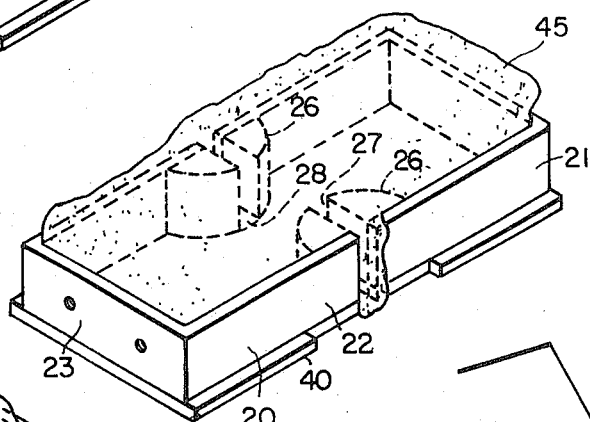
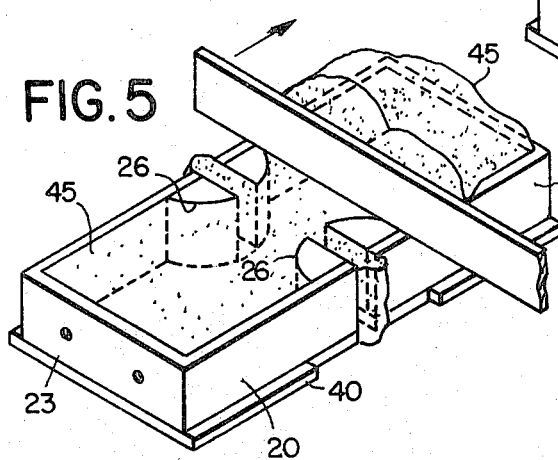
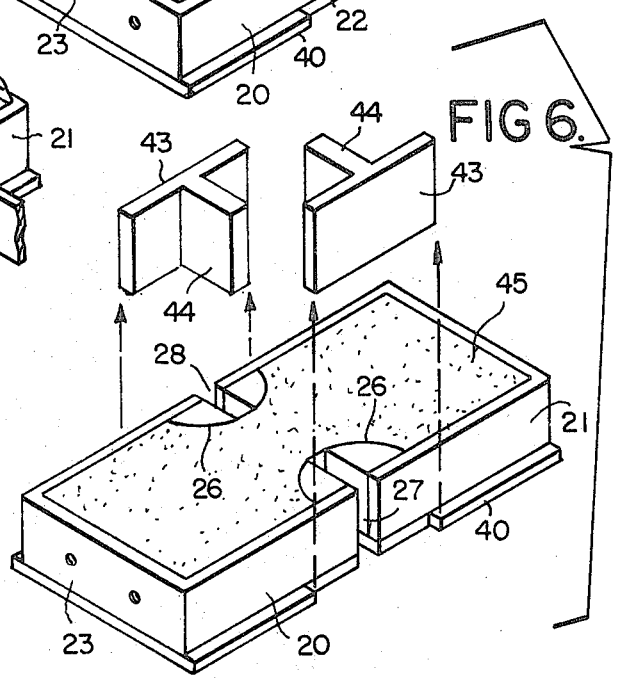
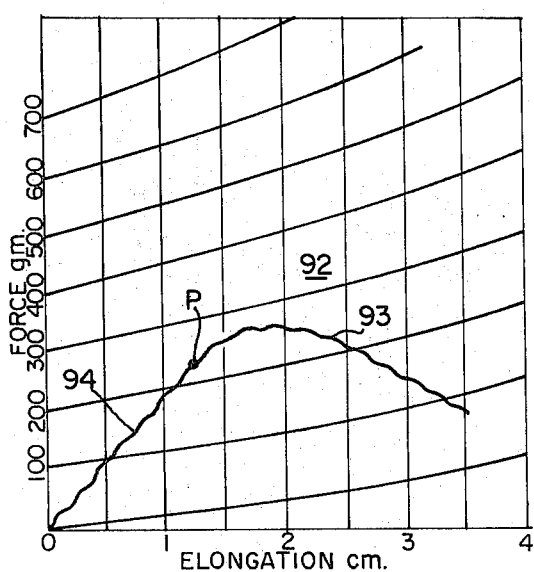

3,789,660

PROCESS, MACHINE AND CHART FOR TENSILE TESTING

DISCLOSURE OF INVENTION

The present invention relates to a tensile testing machine, process of tensile testing and chart, particularly applicable to tensile tests of dough-like materials such as tortilla dough, bread dough, plastic ceramic mixes, and plastics which are soft and dough-like rather than hard.

The invention is believed to have very wide application in the testing of tortilla dough, which is made from nixtamilized corn which is cooked in lime water or the like. This cooked corn can be ground to transform it directly into dough for tortillas, or else it can be ground to dehydrate it and fabricate flour, which is made into dough by simple water addition. During these processes, depending on a multitude of variables, changes take place which affect mechanical properties of the dough and make it desirable to measure these properties, particularly the tensile strength, by some sophisticated method.

By the invention it is possible to apply to tortillas and food products generally, including other flour products, a test which will alert the manufacturer to the fact that the dough is breaking without stretching or with less stretching, or that the dough is undergoing excessive elongation before breaking. Such information is particularly desirable when tortillas are made by machinery which functions very rapidly and which depends for its success upon the knowledge of the precise properties of the dough.

While the invention is particularly applicable to dough for tortillas, it will be evident that many masses of dough-like material, including bread, putties and many industrial products, can be tested by this means.

In the invention the test specimen is made by forcing it into jaws whose sides do not move relative to one another but which have cavities which converge toward their mouths. These jaws are placed in spaced relationship, by a distance which is known and which will constitute the portion of the test specimen subjected to test. In order to insert the test specimen in the jaws without undue effort a mold bottom is applied to the jaws, so that the dough can be pressed into the jaws against the bottom and can occupy all space within the jaw cavities. The excess of dough can then be cut off beyond the side and end walls of the jaws. The mold bottom, between the jaws, has notches and the ends of the jaws and the notches guide a cutter which defines the cross section of the test specimen under test and removes excess of the specimen. The jaws if removed from the machine are then inserted in the machine, one of the jaws being fixed and the other moveable and the mold bottom is removed, its removal being facilitated by a non-adhering plastic sheet between the mold bottom and the specimen.

It will be evident that the specimen can be subjected to tension by a force applying mechanism preferably through a spiral spring.

In recording the results, we preferably move a chart with a force applying mechanism, and operate a pencil or other marking device as the moveable jaw moves to record elongation. In the preferred embodiment, the movement of the chart is given a zig-zag motion at right angles to the tension so that the line plotted on the chart is zig-zag, each of the zig-zag motions indicating the same time interval.

In the drawings one only of the numerous embodiments in which the invention may appear is illustrated selecting the form shown from the standpoints of convenience in illustration, satisfactory operation and clear demonstration of the principles involved.

FIGS. 1 and 1a are perspectives of the testing machine of the invention, spread over two sheets, the left hand portion showing the jaws and the right hand portion showing the chart plate. The separation of the drawing is along the lines C—C.

FIGS. 2, 2a and 2b are exploded perspectives of the most important parts of the testing machine of the invention spread over three sheets. The left hand portion shows the jaws separated from the right hand portion along the line B—B and then from the lower portion along the line A—A. The lower portion shows a portion of the drive separated from the upper portion along the lines A—A and from the right hand portion along the line B—B. The right hand portion is separated from the other portions of this view along the line B—B.

FIG. 3 is a perspective showing the jaws removed from the testing machine and the mold bottom applied.

FIG. 4 is a perspective of the mold of FIG. 3 filled with dough placed into it.

FIG. 5 is a perspective showing the mold of FIG. 3 with the excess cut off at the level of the top.

FIG. 6 is a perspective showing the removal of the excess of test specimen at the sides of the jaws by the special cutter of the invention.

FIG. 7 is a top plan view showing a chart produced by a testing machine of the invention.

Figure 1:
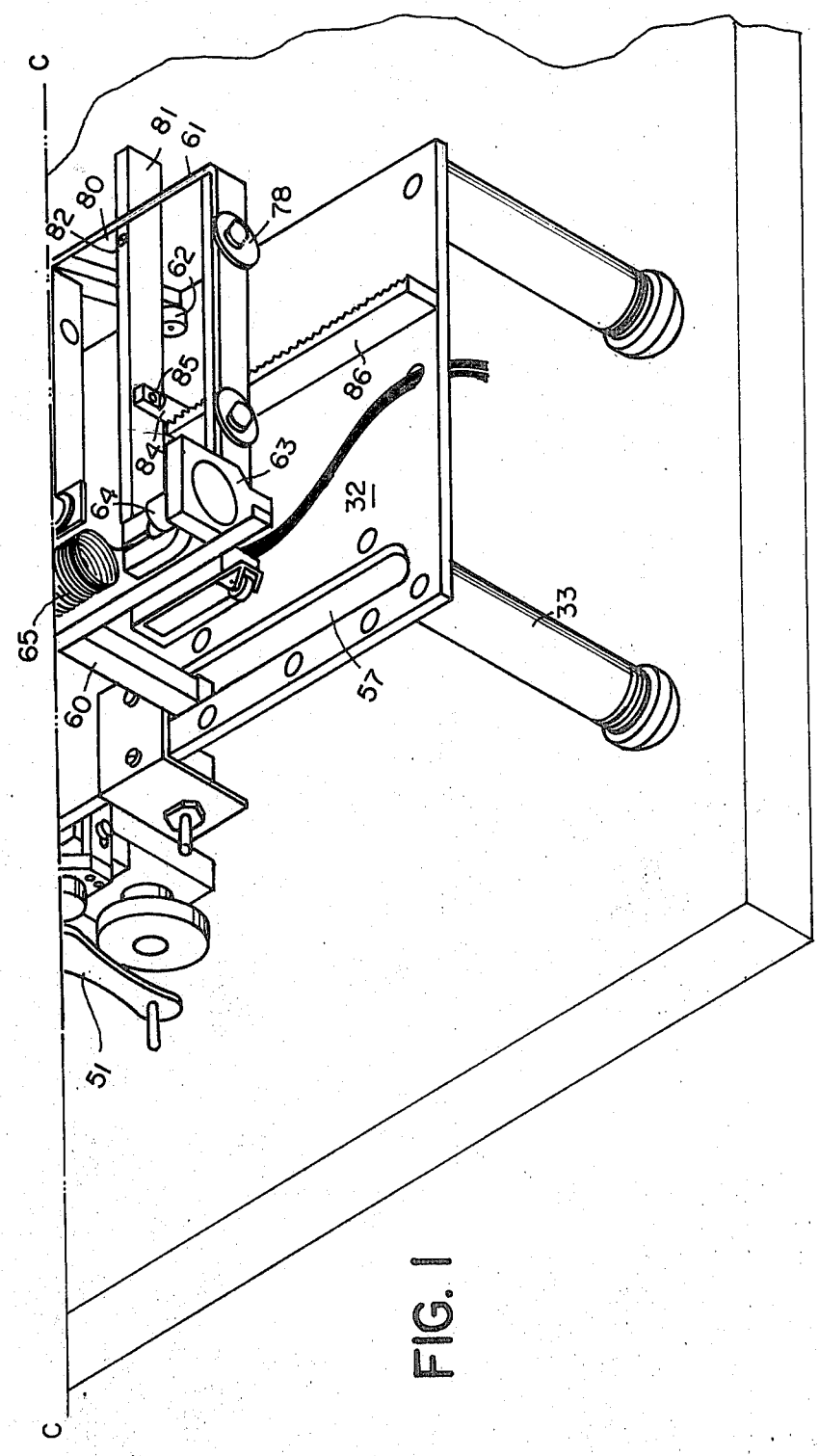
Figure 1A:
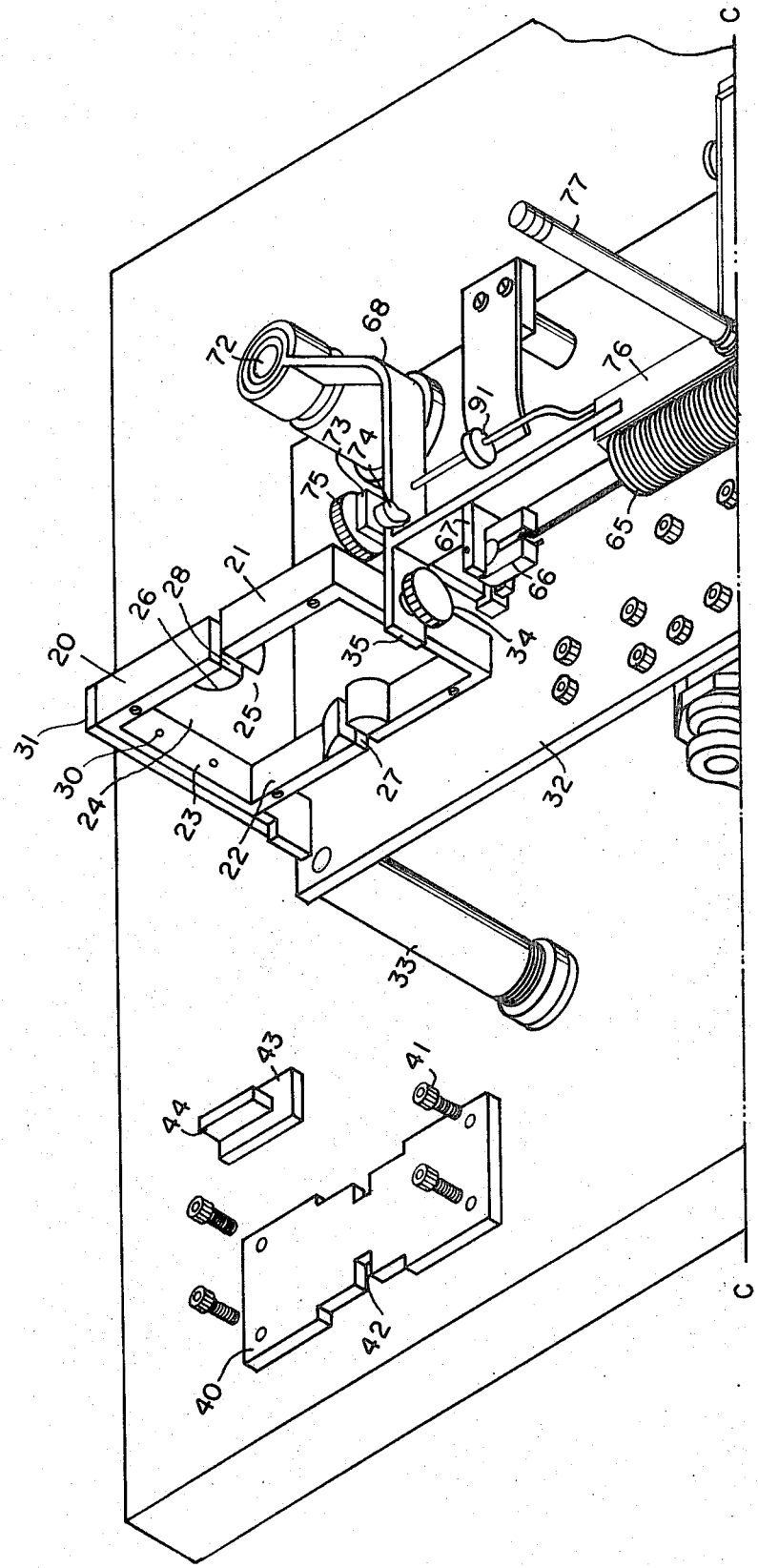
Figure 2:
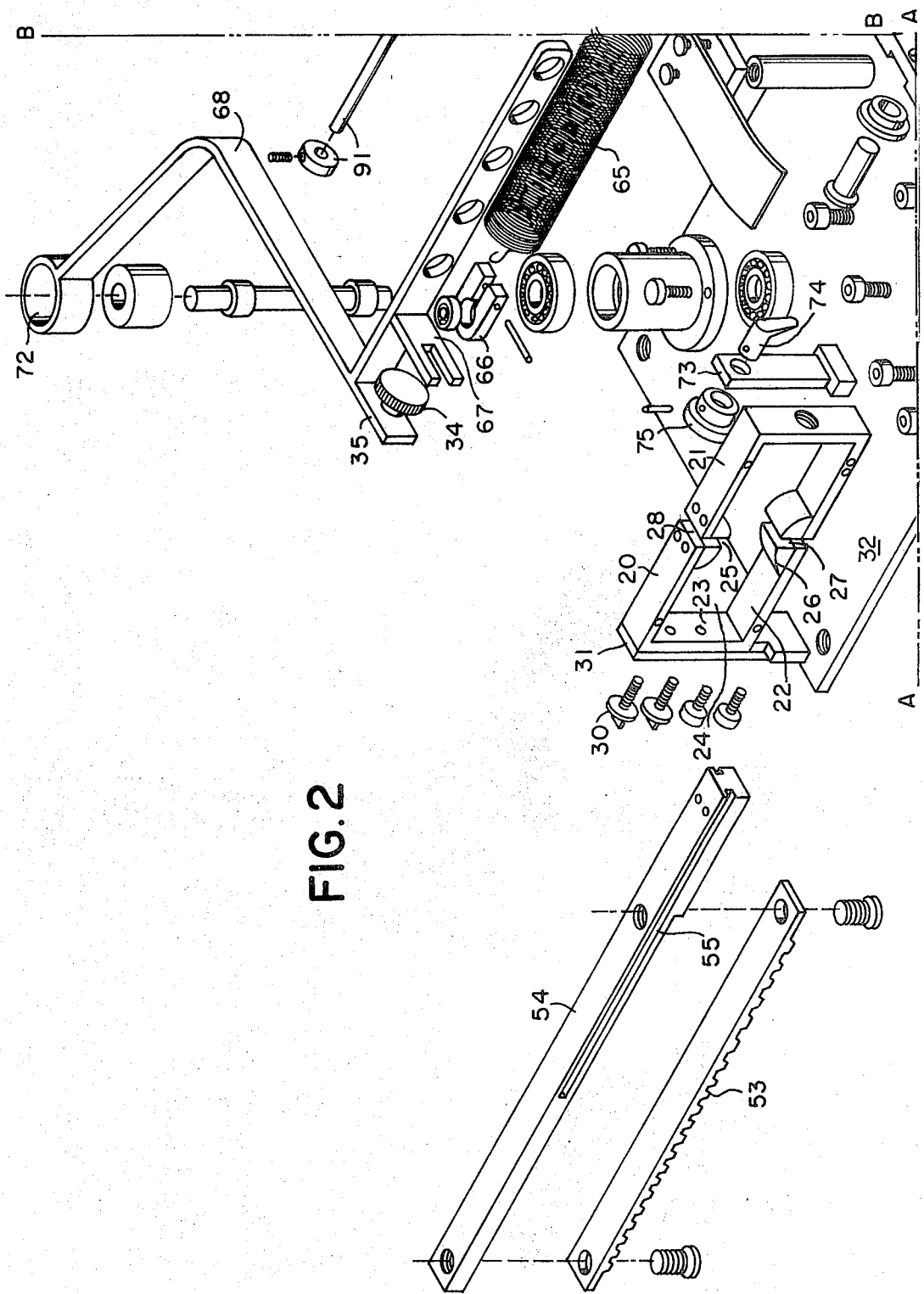
Figure 2A:
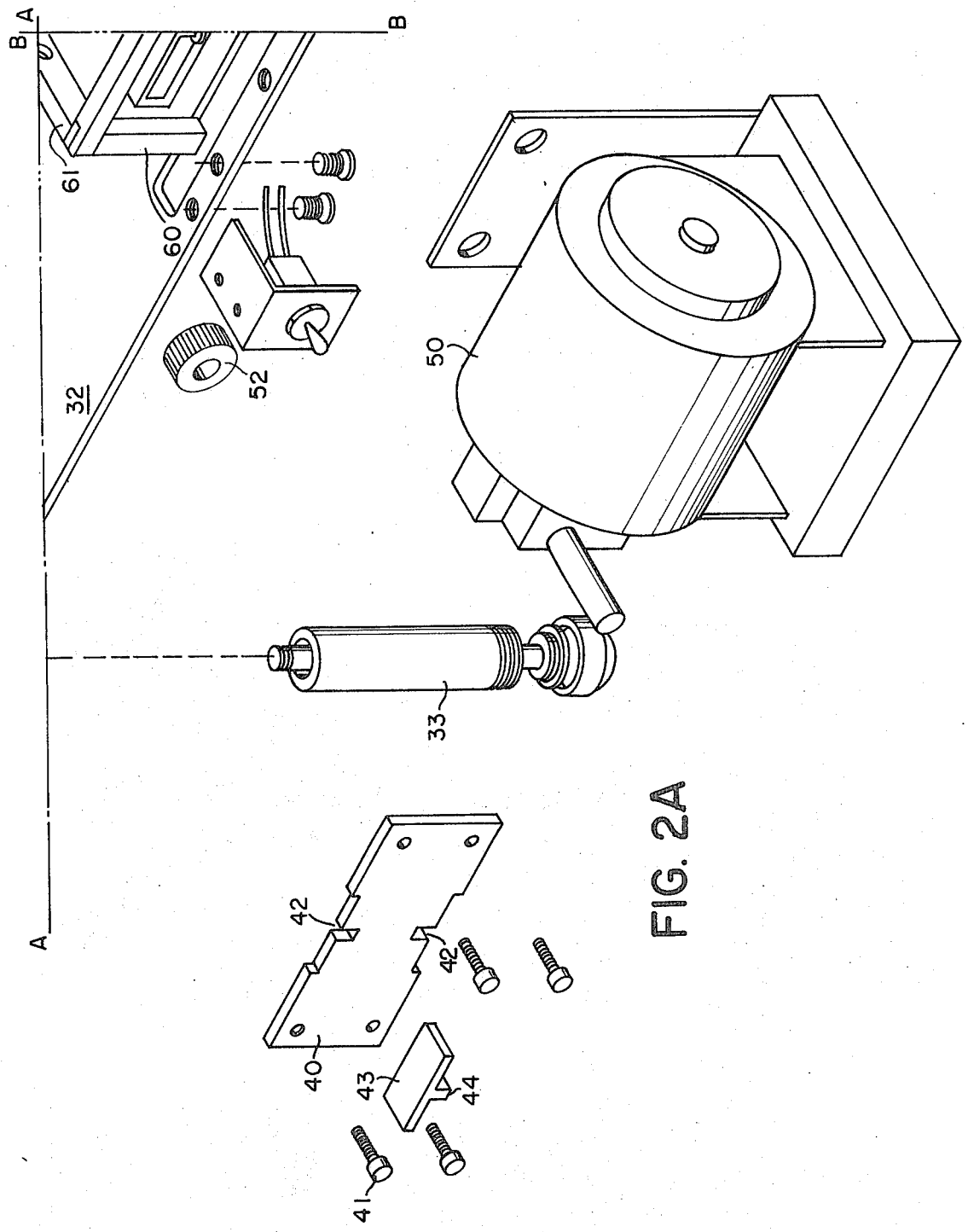
Figure 2B:
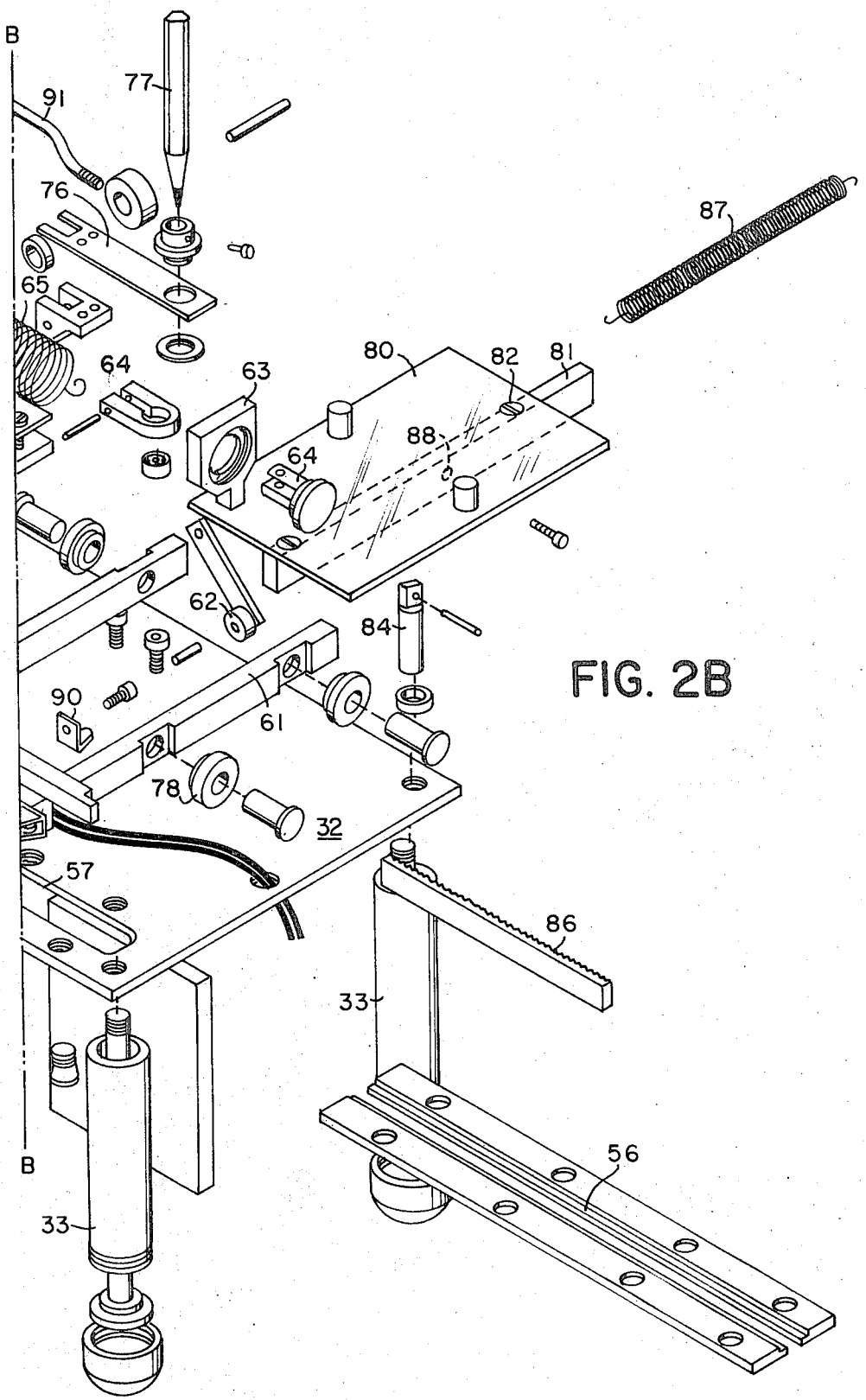

A fixed jaw 20 cooperates with a moveable jaw 21. Each of the jaws have sides 22, ends 23, an open body cavity 24, and a mouth 25 which is substantially rectangular or square and which is aligned with and opposite to the mouth of the opposite jaw. Toward the mouth from the cavity each of the jaws has a convex side wall 26 which beyond the mouth ends in a square surface 27 transverse to the mouth and separated from the other jaw by a space 28 which determines the length of the specimen which will initially undergo tests.

The jaw 20 is removeably supported by screws 30 from a standard 31 on a machine base 32 which is supported on legs 33. The moveable jaw is supported by a screw 34 on a tension bracket 35 to be described. The jaws are capable of being taken out of the machine by removing the screws 30 and 34 and assembled with a mold bottom 40 by screws 41 entering screw holes in the jaws. To prevent the dough-like sample from adhering to the mold bottom 40, a plastic such as polyethylene sheet is inserted over the mold bottom in the preferred embodiment.

When the mold bottom is assembled with the jaws there are side notches 42 opposite the space between the jaw mouths and aligning with the ends of the side walls of the jaws and the surfaces 28 at the ends of the mouths. A cutter 43 has a cutting blade 44 which conforms to the shape of the notches and the space between the jaws and is capable of removing excess dough-like material when the cutter runs across guided by the slot and the ends of the walls.

FIG. 3 shows the assembled mold outside the machine.

FIG. 4 shows the mold cavities filled by dough-like material 45 which is pressed into all spaces and extends beyond the side walls 22 at the top.

In FIG. 5 the excess of dough-like material has been cut off by a spatula or knife running it along the sides and ends of the mold.

In FIG. 6 the dough-like material has been cut by the cutter 43 at the notches to define the test cross section.

It will be evident that, if the jaws have been removed from the testing machine, they are then assembled in the testing machine by restoring the screws 30 and 34, and then the mold bottom 40 is loosened by removing the screws 41. To facilitate removal of the mold bottom and non-sticking to the dough-like specimen, the bottom of the mold is preferably covered by a material which has non-adhesive properties to the dough-like material, such as polyethylene sheet or the like.

The specimen is now ready for test. A motor drive 50 having a speed reducer as well known and a built in clutch 51, has an output gear 52 which engages a rack 53 secured to a slide 54 which has guideways 55, engaging guides 56 which are secured to the base 32 along a slot 57.

The motor drive is of constant speed and controlled by limit switches as well known in the art. The rack 53 and the slide 54 have supported thereon an arm 60 which supports a chart frame 61 having at the bottom a roller 62 to support some of the weight and permit the frame to travel with the arm over the base 32. The frame 61 has an upstanding bracket 63 which supports a spring abutment 64 which makes connection with a helical tension spring 65 extending in the direction of tension of the specimen. The spring 65 at its other end engages a spring abutment 66 pivoted on a yoke 67 on the tension bracket 35 so that through the spring tension may be applied by the motor 50. The tension bracket 35 has a pivot arm 68 which makes pivoted connection with a suitably vertical pivot 72 on the base 32. The pivot preferably has anti-friction bearing means. An upstanding bracket 73 from the base abuts against the side of the tension bracket when it is retracted and permits a latch 74 moved by knob 75 to lock the tension bracket when not in use and to be rendered operative when desired.

The tension bracket has a resilient extension 76 over the frame 61 in which a pencil or other marking implement 77 is supported.

The frame 61 has at the top on the sides rollers 78 which support a chart plate 80, making the chart plate moveable by the tension means 60, but guided transversely. The chart plate 80 may suitably be transparent and is shown as made of transparent material for convenience in inspecting the operation of the chart parts. On its bottom surface the chart plate has a rib 81 attached by screws 82 which rib has a dog 84 secured by screw 85 and engaging a rack 86 attached to the base 32. The plate 80 and the rib 81 are urged to keep the dog into contact with the teeth of the rack by a helical tension spring 87 engaged in the rib 81 at 88 at one end and anchored on the frame by an anchorage 90 at the other end. The marking extension 76 has a weight 91 to make the marking device keep in contact with the paper of chart 92 which is attached on the chart plate 80 and not shown in FIG. 1 but shown in FIG. 7.

In operation, once the sample is pressed into the mold, the excess is cut off at the broad face and the excess also is cut off at the gauge length by the cutter 40 and the mold bottom removed. With a chart on the chart plate 80, and the latch 74 raised or unlocked, the motor drive is started and it applies tension force to the arm 60 and the spring 65 and the jaw 21. The specimen elongates and on chart 92 a line is plotted of which the abscissa is the elongation longitudinally and the ordinate is the tension force. The abscissa is not straight in this device but is arcuate as shown, however, this does not invalidate usefulness of the graph. The isochronic motion trasmitted by the dog 84 moving over the rack 86 as the chart plate moves in tension produces zig-zags 93 corresponding to the teeth of the rack 86 which make it possible to compute time, since the arm 60 is moving at constant speed. Thus the force-elongation diagram 94 includes these zig-zags which may be counted and will enable one to estimate the time of test, which is important in some testing according to the invention. The point P is the proportional limit. The test is stopped by the machine operator when the specimen breaks, and it is possible to calculate various meaningful information from the stress-strain curve, including the modulus of elasticity of the material in tension, which in the case of tortilla dough conveys much useful information to the manufacturer.

It is possible by the invention to pilot charts for two or more dough samples on the same piece of chart paper in order to compare the effects of various methods of compounding or method of preparation of the dough, or the effects of different raw materials.

In the particular device shown the wide cross section of the sample is vertical when testing is performed, but this is a matter of option, though preferred.

In the testing device shown, the moveable jaw of the mold is initially moving tangent to a circle whose radius is the length from pivot 72 to center of sample between jaws.

EXAMPLE

In the preferred embodiment for testing tortilla dough, the distance between the mouths of the jaws of the mold and therefore the length of the part of the specimen initially subject to testing is 5 mm and the mouths of the jaws are 2.5 cm × 2.5 cm, making this specimen of square cross section.

The gauge length of 5 mm has been chosen because it is long enough to provide a meaningful test and not so long that it encourages sagging of the unsupported sample.

In testing it has been found that significant differences can be established between different samples by this testing technique.

In view of our invention and disclosure, variations and modifications to meet individual whim or particular need will doubtless become evident to others skilled in the art, to obtain all or part of the benefits of our invention without copying the method, machine and chart shown, and we therefore claim all such insofar as they fall within the reasonable spirit and scope of our claims.

Having thus described our invention what we claim as new and desire to secure by Letters Patent is:

1. A process of testing samples of dough-like material in tension, which comprises packing the sample between opposed jaws with a portion of the sample undergoing test in the space between the jaws and outside the jaws, applying force longitudinally of the sample between the jaws, progressing a chart in the direction of force application and in proportion to the application of force, plotting motion of the jaws relative to one another on the chart in the direction transverse to the direction of force application, applying the tension force at one end of a helical spring and pulling on one of the jaws with the other end of the helical spring, the chart motion being the motion of the end of the helical spring remote from the test samples and subjecting the chart to a zig-zag motion as the chart moves with a force application in accordance with time.

2. In a testing machine, opposed jaws having end walls and side walls which do not move relative to one another within the jaw, and having opposed mouths defining the sample under test, the cavity within the jaws converging toward the mouths of the jaws and the jaws being adapted to hold and subject to tension a doughlike sample, means for fixing one of the jaws, means for applying force to the other jaw in the direction to elongate the sample under testing, a chart, means for moving the chart in accordance with the force application, means for indicating the position of the moveable jaw on the chart transverse to the direction of movement of the chart, and means for imparting a zig-zag motion to the chart in proportion to time.

3. In a testing machine, opposed jaws having end walls and side walls which do not move relative to one another within the jaw and having opposed mouths defining the sample under test, the cavity within the jaws converging toward the mouths of the jaws and the jaws being adapted to hold and subject to tension a doughlike sample, means for fixing one of the jaws, means for applying force to the other jaw in a direction to elongate the sample under test, a helical spring between the force application means and the moveable jaw to apply the force to the moveable jaw, a chart, means for moving the chart in proportion to movement of the force application means, means for plotting on the chart the motion of the moveable jaw and means for imparting a zig-zag motion of the line on the chart in proportion to time.

4. In a testing machine, opposed jaws having ends, sides and an open center cavity, having mouths of the open center cavity which are opposite one another and equal in cross section, and having converging portions on the side walls toward the mouths, the mouths of the jaws being in spaced relation and the side walls being relatively stationary to one another within each jaw, a mold bottom fitting on the bottom of the cavity against the side and end walls and defining one end of the test sample in the jaws, means for affixing the mold bottom to the jaws temporarily while the sample is placed in the mold, the mold bottom having notches opposite the space between the jaws and a cutter slideable in the notches to remove surplus material from the test sample and to make the test sample between the notches conform to the shape of the mouths of the jaws.

5. In a testing machine, opposed jaws which move relative to one another and having opposed mouths defining the sample under test, the cavity within the jaws converging toward the mouths of the jaws and the jaws being adapted to hold and subject to tension a doughlike material, means for fixing one of the jaws, means for applying force to the other jaw in a direction to elongate the sample and a recording system adapted to record force as one variable, elongation as a second variable and time as a third variable.

6. A testing machine according to claim 5, in which the elongating force is applied by a spring so that the application of force is variable.

7. A testing machine according to claim 5, in which there is a circular path of relative motion of the mold parts during testing.

8. In a testing machine, a double U-shaped mold which itself serves as holding means to subject to tensile testing a soft plastic or dough-like material sample, the mold parts having opposed mouths disposed in front of one another at a distance, leaving a portion of the sample unsupported, the mouth openings being identical on both mold parts and the mold cavities converging outwardly toward the mouths, both U-shaped parts of the mold being free to move with respect to one another within a plane and during testing of the sample, means for applying force to one of the mold parts relative to another to elongate the sample and means for recording elongation, force applied to the sample and time.

9. In a testing machine, a double U-shaped mold which itself serves as holding means to subject to tensile testing a soft plastic or dough-like material sample, the mold parts having opposed mouths disposed in front of one another at a distance, leaving a portion of the sample unsupported, the mouth openings being identical on both mold parts and the mold cavities converging outwardly toward the mouths, both U-shaped parts of the mold being susceptible of relative motion away from one another, means for subjecting one part of the mold to force relative to the other, means for recording elongation and force applied, and means for superimposing a zig-zag motion on a chart recording force and elongation, the zig-zag motion being a function of time.

10. The invention according to claim 9, in which the movable mold half has freedom to move circularly.

11. The invention according to claim 10, in which the force is applied by a spring, so that there is a gradual force application.

12. A process of tensile testing, which comprises placing a soft plastic sample into a mold which has opposed parts with a portion of the sample between the parts unsupported in the mold, the mold parts having opposed mouths disposed opposite to one another, the mouth opening being identical on both mold parts and the mold cavity converging outwardly toward the mouth, cutting off the surplus of test sample from the mold cavity, cutting off the surplus of test sample on either side of the mouth, holding one of the mold parts stationary, applying force to the other one of the mold parts in the direction which will elongate the sample between the parts, the tension force being applied at one end of a spiral spring and the other end of the spiral spring applying the tension force to the mold part, moving a chart in the direction of force application following the remote end of the spring from the test sample, moving a marking element on the chart to trace the elongation of the sample and imparting to the chart a predetermined zig-zag motion with passage of time so that the chart plots force in one direction, elongation in another direction and zig-zag motion of the line plots time.

* * * * *